(No Model.) 2 Sheets—Sheet 1.

J. P. MEGONIGAL.
ATTACHMENT FOR CARDING MACHINES.

No. 596,605. Patented Jan. 4, 1898.

WITNESSES
Thos. L. Gatchel.
J. E. Tappan

INVENTOR,
John P. Megonigal
by John Wedderburn
Attorney (No Model.) 2 Sheets—Sheet 2.
J. P. MEGONIGAL.
ATTACHMENT FOR CARDING MACHINES.
No. 596,605. Patented Jan. 4, 1898.
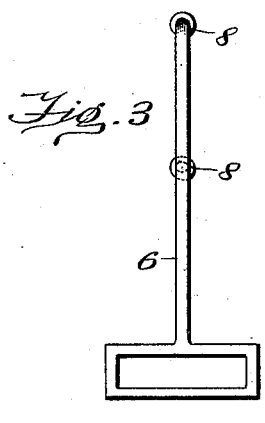
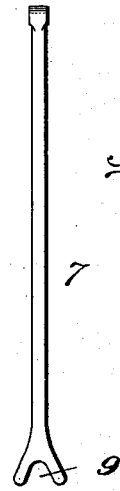
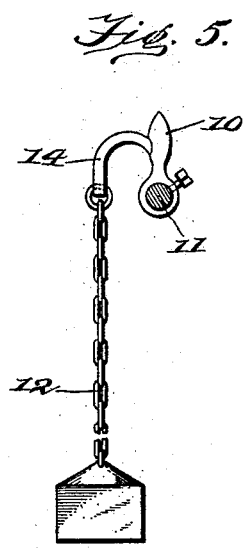
WITNESSES
INVENTOR
John P. Megonigal,
by John Wedderburn
Attorney

United States Patent Office.

JOHN P. MEGONIGAL, OF GLADWYNE, PENNSYLVANIA, ASSIGNOR OF ONE-HALF TO CHARLES J. FRYER, OF LOWER MERION, PENNSYLVANIA.

ATTACHMENT FOR CARDING-MACHINES.

SPECIFICATION forming part of Letters Patent No. 596,605, dated January 4, 1898.

Application filed September 21, 1896. Serial No. 606,559. (No model.)

*To all whom it may concern:*

Be it known that I, JOHN P. MEGONIGAL, a citizen of the United States, residing at Gladwyne, in the county of Montgomery and State of Pennsylvania, have invented certain new and useful Improvements in Attachments for Carding-Machines; and I do hereby declare the following to be a full, clear, and exact description of the invention, such as will enable others skilled in the art to which it appertains to make and use the same.

This invention has reference to improvements in carding-machines, the object being to provide devices that will operate to stop the feeding-rollers when the licker-in becomes choked and prevent injury to the carding-machine.

The invention consists in the features of construction hereinafter described and claimed.

Figure 1:
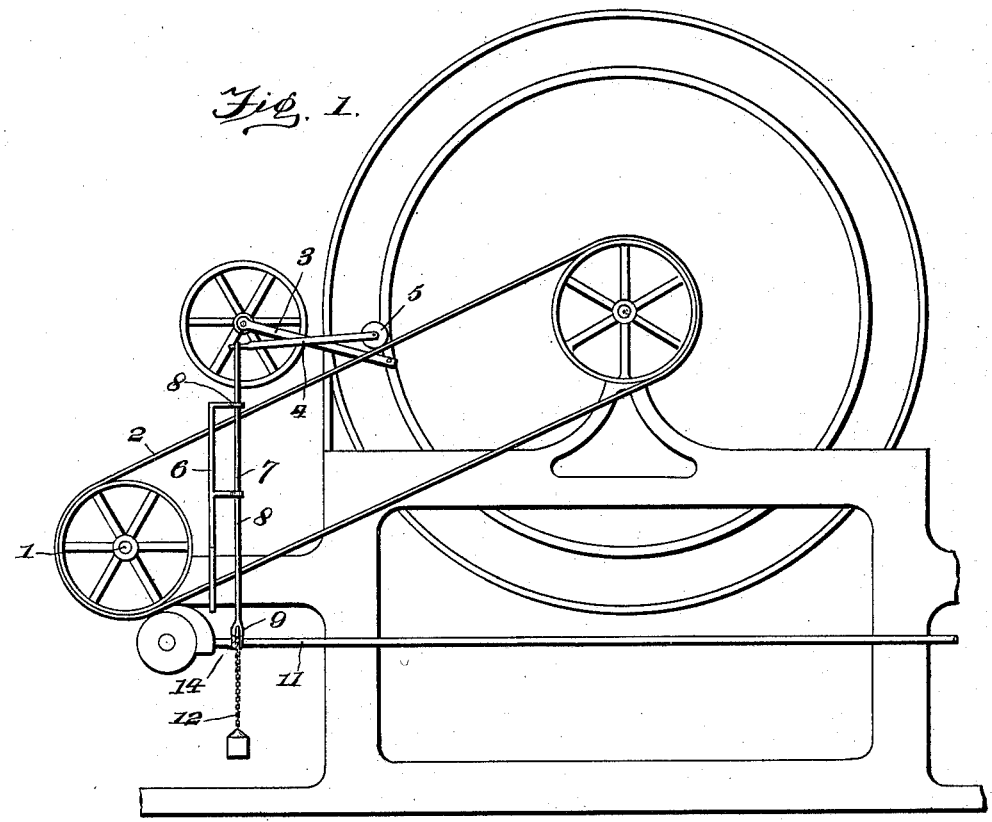
Figure 2:
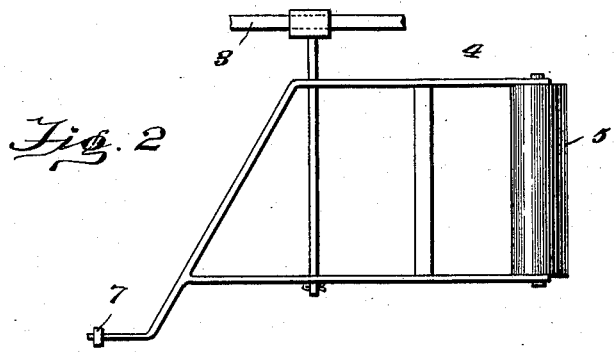

In the accompanying drawings, forming a part of this specification, Figure 1 is a side elevation of a portion of a carding-machine provided with my improvements. Fig. 2 is a plan of my improvement. Figs. 3, 4, and 5 are details of the same.

Referring now to said drawings, 1 indicates the licker-in shaft, which is geared by means of a belt 2 to the large cylinder of the machine. Mounted upon an arm 3, secured to the frame of the machine, is a pivoted frame 4, which is provided at one end with a roller 5 to rest upon the licker-in belt 2. The said frame 4 is pivoted near its opposite end, so that the end upon which the roller 5 is mounted is the heaviest. To a projection 6 at the other end of the frame is secured the upper end of the upright rod 7, that is supported in guides 8 of the frame of the machine and which is provided at its lower end with a socket 9 to receive a stem 10. The said stem 10 projects from the shaft 11, that is connected with the gearing for driving the feed-roller in such a manner that a partial rotation of the said shaft 11 will throw the gearing out of mesh to stop the rotation of the feed-roller. Secured also to the said shaft 11 is a chain or cable 12, having at its lower end the weight 13, sufficient to turn the said shaft 11, the connection between the cable 12 and said shaft being made by a curved arm 14, upon which the said cable rests in the manner shown.

The parts being constructed and arranged as above described, the operation is as follows: The pulley 5 of the pivoted frame 4 rests normally upon the licker-in belt, thereby holding the socket 9 over the upper end of the stem 10, in which position the shaft 11 serves to hold the driving-gear in operative position. When, however, the licker-in chokes and stops rotating, the belt 2 invariably falls from the pulleys. The falling of the belt cannot be specifically described as due to any particular cause, but it is found in practice that when the licker-in chokes and stops this belt will fall from the pulleys. When the licker-in stops, the belt will always slip off the pulleys and in some cases break, and as far as I am informed it is due to the fact of the stoppage of one pulley while the belt is being driven by the other. This permits the end of the frame 4 to drop, which lifts the rod 7 and releases the stem of the operating-shaft. When this shaft is free to rotate, the weight 13 falls and turns the shaft in an obvious manner, which, through the gearing described, brings the gearing of the feed-rollers to an inoperative position, thereby stopping the feed-rollers and preventing more of the lap being fed to the licker-in.

It is obvious that with my improvements all expensive and troublesome injuries to carding-machines, necessitating long delays and loss of time, are effectually avoided.

Having thus described my invention, what I claim as new, and desire to secure by Letters Patent, is—

1. The combination with the licker-in shaft, large cylinder of a carding-machine and the licker-in belt geared to said shaft and cylinder and extending in an inclined position, of a pivoted frame that stands normally in a practically-horizontal position, a roller upon one end of said frame forming a weight, and a connection between said pivoted frame and devices for controlling the rotation of the feed-rollers.

2. The combination with the licker-in belt, of a pivoted frame carrying a roller normally resting upon said belt, a rod connected with said frame and provided at its other end with a socket, a rotatable shaft connected with and controlling the driving-gear for the feed-rollers, devices for turning said shaft and a stem upon said shaft to be engaged by said socket, substantially as described.

3. The combination with the licker-in belt, of a pivoted frame carrying a roller normally resting thereon, an upright rod connected with the other end of said frame and having a socket, a rotatable shaft connected with and controlling the driving-gear for the feed-rollers, a stem upon said shaft adapted to be engaged by said socket, a curved arm upon said shaft, and a weighted cable connected with said shaft and passing through said curved arm, substantially as described.

In testimony whereof I have signed this specification in the presence of two subscribing witnesses.

JOHN P. MEGONIGAL.

Witnesses:
CHARLES J. FRYER,
ANGIE L. MILLER.